United States Patent [19]
Morris
[11] 3,873,976
[45] Mar. 25, 1975

[54] MEMORY ACCESS SYSTEM

[75] Inventor: James McCabe Morris, San Diego, Calif.
[73] Assignee: Burroughs Corporation, Detroit, Mich.

[22] Filed: July 30, 1973
[21] Appl. No.: 383,913

[52] U.S. Cl. 340/172.5
[51] Int. Cl. G06f 13/06
[58] Field of Search 340/172.5

[56] References Cited
UNITED STATES PATENTS

| | | | |
|---|---|---|---|
| 3,109,162 | 10/1963 | Wolensky | 340/172.5 |
| 3,161,763 | 12/1964 | Glaser | 340/172.5 |
| 3,270,325 | 8/1966 | Carter et al. | 340/172.5 |
| 3,274,558 | 9/1966 | Sharp et al. | 340/172.5 |
| 3,346,727 | 10/1967 | Lethin et al. | 340/172.5 |
| 3,440,615 | 4/1969 | Carter | 340/172.5 |
| 3,496,550 | 2/1970 | Schachner | 340/172.5 |
| 3,739,352 | 6/1973 | Packard | 340/172.5 |

*Primary Examiner*—Gareth D. Shaw
*Assistant Examiner*—John P. Vandenburg
*Attorney, Agent, or Firm*—Arthur Decker; Nathan Cass; Edward G. Fiorito

[57] ABSTRACT

Disclosed is a digital computer memory access system which operates to make available storage for fields of information regardless of the fixed word structure of the computer, and includes means for directing access to either end of the field by specifying the address of its containment word and the bit distance offset between the selected field end and a selected end of the word, means, if needed, for aligning the field end according to the computer word period and means for memory read and write, through a buffer, serially by bit starting at the accessed field end.

14 Claims, 21 Drawing Figures

FIG. 2

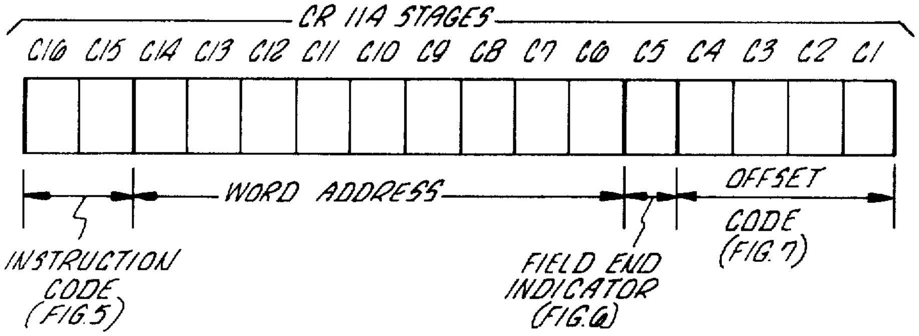

FIG. 3

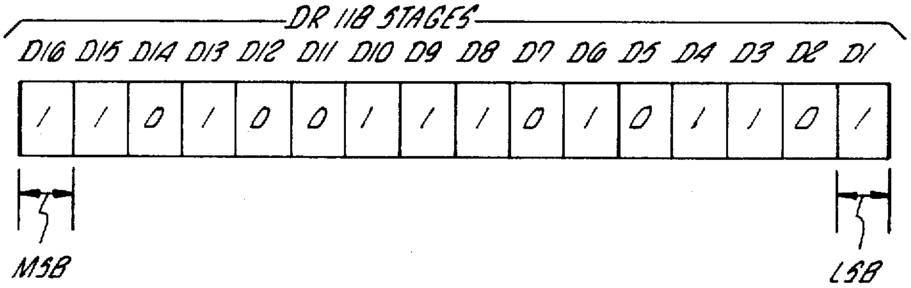

FIG. 4

| UNIT | CONTENTS OR FUNCTION | CAPACITY |
|---|---|---|
| ALU 100 | PERFORM SYSTEM LOGIC | ——— |
| MU 108 | DATA STORAGE | 612 WORDS |
| OCU 110 | INFORMATION ENTRY, DISPLAY, CONTROL BY OPERATOR | ——— |
| CR 114 | COMMAND UNDER EXECUTION | 16 STAGES C16 - C1 |
| DR 118 | WORD AFFECTED BY INSTRUCTION | 16 STAGES D16 - D1 |
| SC 120 | COUNTS SHIFTS OF DR 118 | 4 STAGES S4 - S1 |
| LR 124 | FIELD LENGTH | 11 STAGES L11 - L1 |
| MAU 112 | ADDRESS MU 108 | ——— |
| BR 122 | BUFFER FOR DR 118 | 16 STAGES |
| K1 | CONTROL FOR PCU 104 | 1 STAGE |
| K2 | SHIFT DIRECTION CONTROL FOR DR 118; COUNT DIRECTION CONTROL FOR SC 120 | 1 STAGE |
| CU 102 | CLOCK SIGNAL GENERATOR | ——— |
| BPC 106 | BIT PERIOD COUNTER | ——— |
| PCU 104 | SEQUENCING THROUGH FLOW DIAGRAM | ——— |

| INSTRUCTION CODES | | |
|---|---|---|
| INSTRUCTIONS | CR 114 STAGES | |
| | C16 | C15 |
| READ | 0 | 0 |
| READ-RESTORE | 0 | 1 |
| WRITE [1/0] | 1 | 0 |
| WRITE [BR] | 1 | 1 |

FIG. 5

| FIELD END INDICATORS | |
|---|---|
| CR 114 STAGE | C5 |
| ACCESS LSB→MSB | 0 |
| ACCESS MSB→LSB | 1 |

FIG. 6

FIG. 7

| OFFSET CODES | | | | |
|---|---|---|---|---|
| COUNTS | CR 114 STAGES | | | |
| | C4 | C3 | C2 | C1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

FIG. 8

| FIELD LENGTH CODES | | | | |
|---|---|---|---|---|
| COUNTS | LR 124 STAGES | | | |
| | L11 | ---- | L2 | L1 |
| 0 | 0 | ---- | 0 | 0 |
| 1 | 0 | ---- | 0 | 1 |
| 2 | 0 | ---- | 1 | 0 |
| ⋮ | ⋮ | | ⋮ | ⋮ |
| 2046 | 1 | ---- | 1 | 0 |
| 2047 | 1 | ---- | 1 | 1 |

FIG. 10a.

| | DR 118 | | | | | | | | | | | | | | | | SC 120 | C4-C1 |
|---|---|---|---|---|---|---|---|---|---|---|---|---|---|---|---|---|---|---|
| | END OF FIELD | | | | | | EXTRANEOUS | | | | | | | | | | | |
| | D16 | D15 | D14 | D13 | D12 | D11 | D10 | D9 | D8 | D7 | D6 | D5 | D4 | D3 | D2 | D1 | | |
| AS READ FROM MEM. (PC2) | 1 | 1 | 0 | 1 | 0 | -0- | 1 | 1 | 1 | 0 | 1 | 0 | 1 | 1 | 0 | 1 | 0 | 6 |
| SHIFT LEFT | 1 | 0 | 1 | 0 | -0- | 1 | 1 | 1 | 0 | 1 | 0 | 1 | 1 | 0 | 1 | 1 | 1 | 5 |
| | 0 | 1 | 0 | -0- | 1 | 1 | 1 | 0 | 1 | 0 | 1 | 1 | 0 | 1 | 1 | 1 | 2 | 4 |
| | 1 | 0 | -0- | 1 | 1 | 1 | 0 | 1 | 0 | 1 | 1 | 0 | 1 | 1 | 1 | 0 | 3 | 3 |
| | 0 | -0- | 1 | 1 | 1 | 0 | 1 | 0 | 1 | 1 | 0 | 1 | 1 | 1 | 0 | 1 | 4 | 2 |
| | -0- | 1 | 1 | 1 | 0 | 1 | 0 | 1 | 1 | 0 | 1 | 1 | 1 | 0 | 1 | 0 | 5 | 1 |
| JUSTIFIED RIGHT (PC5) | 1 | 1 | 1 | 0 | 1 | 0 | 1 | 1 | 0 | 1 | 1 | 1 | 0 | 1 | 0 | -0- | 6 | 0 |

FIG. 10b.

| | DR 118 | | | | | | | | | | | | | | | | SC 120 | C4-C1 |
|---|---|---|---|---|---|---|---|---|---|---|---|---|---|---|---|---|---|---|
| | END OF FIELD | | | | | | | | | | | EXTRANEOUS | | | | | | |
| | D16 | D15 | D14 | D13 | D12 | D11 | D10 | D9 | D8 | D7 | D6 | D5 | D4 | D3 | D2 | D1 | | |
| AS READ FROM MEM. (PC2) | 1 | 1 | 0 | 1 | 0 | 0 | 1 | 1 | 1 | 0 | -1- | 0 | 1 | 1 | 0 | 1 | 0 | 11 |
| SHIFT RIGHT | 1 | 1 | 1 | 0 | 1 | 0 | 0 | 1 | 1 | 1 | 0 | -1- | 0 | 1 | 1 | 0 | 1 | 12 |
| | 0 | 1 | 1 | 1 | 0 | 1 | 0 | 0 | 1 | 1 | 1 | 0 | -1- | 0 | 1 | 1 | 2 | 13 |
| | 1 | 0 | 1 | 1 | 1 | 0 | 1 | 0 | 0 | 1 | 1 | 1 | 0 | -1- | 0 | 1 | 3 | 14 |
| | 1 | 1 | 0 | 1 | 1 | 1 | 0 | 1 | 0 | 0 | 1 | 1 | 1 | 0 | -1- | 0 | 4 | 15 |
| JUSTIFIED RIGHT (PC5) | 0 | 1 | 1 | 0 | 1 | 1 | 1 | 0 | 1 | 0 | 0 | 1 | 1 | 1 | 0 | -1- | 5 | 0 |

FIG. 11.

| C5 | K2 | OFFSET CODE | CORRESPONDS TO FIELD READOUT START | DR 118 SHIFT | SC 120 ACTIVITY |
|---|---|---|---|---|---|
| 0 | 0 | >7 | LSB | RIGHT | INCREMENT |
| 1 | 0 | >7 | MSB | RIGHT END-AROUND | DECREMENT |
| 0 | 1 | ≦7 | LSB | LEFT END-AROUND | DECREMENT |
| 1 | 1 | ≦7 | MSB | LEFT | INCREMENT |

PC5

IF K2=1, SHIFT [DR] LEFT AND DECREMENT [C4-C1]; STOP WHEN [C4-C1]=0.

IF K2=0, SHIFT [DR] RIGHT AND INCREMENT [C4-C1]; STOP WHEN [C4-C1]=0.

INCREMENT [SC]; STOP WHEN [C4-C1]=0.

${}_1d_1=(D_{16}K_2+D_2K_2')(C_4+C_3+C_2+C_1)$ ${}_0d_1=(D_{16}'K_2+D_2'K_2')(C_4+C_3+C_2+C_1)$ ${}_1d_2=(D_1K_2+D_3K_2')(C_4+C_3+C_2+C_1)$ ${}_0d_2=(D_1'K_2+D_3'K_2')(C_4+C_3+C_2+C_1)$ $\vdots$ $\vdots$ ${}_1d_{16}=(D_{15}K_2+D_1K_2')(C_4+C_3+C_2+C_1)$ ${}_0d_{16}=(D_{15}'K_2+D_1'K_2')(C_4+C_3+C_2+C_1)$ ${}_1c_1=C_1'(C_4+C_3+C_2+C_1)$ ${}_0c_1=C_1(C_4+C_3+C_2+C_1)$ ${}_1c_2=(C_2'C_1'K_2+C_2'C_1K_2')(C_4+C_3+C_2+C_1)$ ${}_0c_2=(C_2C_1'K_2+C_2C_1K_2')(C_4+C_3+C_2+C_1)$ ${}_1c_3=(C_3'C_2'C_1'K_2+C_3'C_2C_1K_2')(C_4+C_3+C_2+C_1)$ ${}_0c_3=(C_3C_2'C_1'K_2+C_3C_2C_1K_2')(C_4+C_3+C_2+C_1)$ ${}_1c_4=(C_4'C_3'C_2'C_1'K_2+C_4'C_3C_2C_1K_2')(C_4+C_3+C_2+C_1)$ ${}_0c_4=(C_4C_3'C_2'C_1'K_2+C_4C_3C_2C_1K_2')(C_4+C_3+C_2+C_1)$ ${}_1s_1=S_1'(C_4+C_3+C_2+C_1)$ ${}_0s_1=S_1(C_4+C_3+C_2+C_1)$ ${}_1s_2=S_2'S_1(C_4+C_3+C_2+C_1)$ ${}_0s_2=S_2S_1(C_4+C_3+C_2+C_1)$ ${}_1s_3=S_3'S_2S_1(C_4+C_3+C_2+C_1)$ ${}_0s_3=S_3S_2S_1(C_4+C_3+C_2+C_1)$ ${}_1s_4=S_4'S_3S_2S_1(C_4+C_3+C_2+C_1)$ ${}_0s_4=S_4S_3S_2S_1(C_4+C_3+C_2+C_1)$

FIG. 12g

PCO

SHIFT [DR], TRANSFER MSB OR LSB TO [BR]; STOP WHEN [SC] = 0.

IF K2 = C5, INCREMENT [SC]; IF K2 ≠ C5, DECREMENT [SC].

STOP [DR] SHIFT & [SC] INCREMENT/DECREMENT WHEN [SC] = 0.

FILL [DR] ACCORDING TO INSTRUCTION CODE IN CR:

IF C16 = C15 = 0, RESET [DR],

IF C16 = 0 & C15 = 1, RECIRCULATE [DR],

IF C16 = 1 & C15 = 0, FILL [DR] FROM [I/O],

IF C16 = C15 = 1, FILL [DR] FROM [BR].

DECREMENT [LR]; STOP WHEN [LR] = 0.

${}_1d_1 = C'_{16}C_{15}(D_{16}C_5 + D_2C'_5)(S_4+S_3+S_2+S_1)$ ${}_0d_1 = \{C'_{16}C'_{15}B_1 + C'_{16}C_{15}(D'_{16}C_5 + D'_2C'_5)\}(S_4+S_3+S_2+S_1)$ $[D1] = \{C_{16}C'_{15}[I/O] + C_{16}C_{15}[BR]\}(S_4+S_3+S_2+S_1)$ ${}_1d_2 = C'_{16}C_{15}(D_1C_5 + D_3C'_5)(S_4+S_3+S_2+S_1)$ ${}_0d_2 = \{C'_{16}C'_{15}B_2 + C'_{16}C_{15}(D'_1C_5 + D'_3C'_5)\}(S_4+S_3+S_2+S_1)$ $[D2] = \{C_{16}C'_{15}[I/O] + C_{16}C_{15}[BR]\}(S_4+S_3+S_2+S_1)$ ${}_1d_{16} = C'_{16}C_{15}(D_{15}C_5 + D_1C'_5)(S_4+S_3+S_2+S_1)$ ${}_0d_{16} = \{C'_{16}C'_{15}B_{16} + C'_{16}C_{15}(D'_{15}C_5 + D'_1C'_5)\}(S_4+S_3+S_2+S_1)$ $[D16] = \{C_{16}C'_{15}[I/O] + C_{16}C_{15}[BR]\}(S_4+S_3+S_2+S_1)$ $[BR] = ([D16]C_5 + [D1]C'_5)(S_4+S_3+S_2+S_1)$ ${}_1\ell_1 = L'_1(S_4+S_3+S_2+S_1)(L_{11}+L_{10}\cdots+L_1)$ ${}_0\ell_1 = L_1(S_4+S_3+S_2+S_1)(L_{11}+L_{10}\cdots+L_1)$ ${}_1\ell_2 = L'_2L'_1(S_4+S_3+S_2+S_1)(L_{11}+L_{10}\cdots+L_1)$ ${}_0\ell_2 = L_2L'_1(S_4+S_3+S_2+S_1)(L_{11}+L_{10}\cdots+L_1)$ ${}_1s_1 = S'_1(S_4+S_3+S_2+S_1)$ ${}_0s_1 + S_1(S_4+S_3+S_2+S_1)$ ${}_1s_2 = \{S'_2S_1(C_5K'_2+C'_5K_2) + S'_2S_1(C_5K_2+C'_5K'_2)\}(S_4+S_3+S_2+S_1)$ ${}_0s_2 = \{S_2S'_1(C_5K'_2+C'_5K_2) + S_2S_1(C_5K_2+C'_5K'_2)\}(S_4+S_3+S_2+S_1)$ ${}_1s_3 = \{S'_3S'_2S_1(C_5K'_2+C'_5K_2) + S'_3S_2S_1(C_5K_2+C'_5K'_2)\}(S_4+S_3+S_2+S_1)$ ${}_0s_3 = \{S_3S'_2S'_1(C_5K'_2+C'_5K_2) + S_3S_2S_1(C_5K_2+C'_5K'_2)\}(S_4+S_3+S_2+S_1)$ ${}_1s_4 = \{S'_4S'_3S'_2S_1(C_5K'_2+C'_5K_2) + S'_4S_3S_2S_1(C_5K_2+C'_5K'_2)\}(S_4+S_3+S_2+S_1)$ ${}_0s_4 = \{S_4S'_3S'_2S'_1(C_5K'_2+C'_5K_2) + S_4S_3S_2S_1(C_5K_2+C'_5K'_2)\}(S_4+S_3+S_2+S_1)$

FIG. 12h

MEMORY ACCESS SYSTEM

BACKGROUND OF THE INVENTION

Computer technology has advanced to a current state characterized by systems in which each of their building blocks (e.g., the memory, the processor and interfaces to peripherals) are not only represented by a variety of different types, but also in the plurality and with a wide selection of admixtures. Thus, in the same system, a processor may coordinate through interfaces, with a number of peripherals comprising different magnetic and paper tape units, disk, and drum files, and magnetic core stacks, and each may be burdened by constraints which makes its data quantum different from not only those of the others, but from the processor's as well. Additionally, even in its internal operations, the processor may perform certain operations, (editing, sorting, merging floating point arithmetic are typical), for which a "natural" data unit unique to the operation may be defined. This uniqueness, of course, relates to the data unit's internal structure and the element of structure most relevant to memory access is length. Thus, for example, a sorting routine may contemplate handling hundreds of data units each many times larger, in bit size, than the computer's word length, and a merging routine may contemplate handling the sorted data units according to only a portion of each, i.e., the sizes of the natural data units for the two routines are different. Further, it is very unlikely that the programmer will care to store these data units in word alignment in the memory since this requires him to coordinate any particular problem with regard to both the routine's natural data unit and the computer's data word. This requirement, of course, encumbers the programming effort with additional logging operations not directly related to the accomplishment of the program objective.

In brief, it would be preferable to provide system operation on natural data units, thereby simplifying memory addressing and access and, in addition, to provide serial-by-bit access thereto starting with either end of the data unit. This approach has frequently been designated as variable field length operation and, although many ways have been devised to specify it, the way that seems to optimize indexing, i.e., permits the handling of fewer computer commands, for instance, is the specification of either the first or last bit (either end) of the field and the field length.

SUMMARY OF THE INVENTION

The present invention, then, makes use of the aforementioned approach and, as represented by its preferred embodiment, introduces into a known computer memory access system, equipment taking the form of memory elements and combinations thereof (registers, counters, buffers, etc.) and logic for their control as follows.

The computer memory is word organized and, for simplicity, memory access is via a 1-word data register; however, peripherals (e.g. I/O devices) may handle data differently and, consequently, interface between the data register and I/O lines is via a buffer register capable of storing many words of data. For memory access, the command specifies the address which does or will include the field's most significant (MSB) or least significant bit (LSB), an identifier thereof and the offset of the selected bit from the word beginning or end, the rest of the field being accessed in order of increasing or decreasing significance a word at a time.

Transfers between the data register and the memory is of a word parallel by bit. In the data register, the word is justified if necessary by shifting, left or right, respectively, according to whether the offset magnitude is at least one-half the word length or not. Transfers between the data and buffer registers are of the word portion containing the field, serial by bit from the end of the data register to which the justification was referenced. This operation is repeated for other field-containing words until a counter indicates that the field is exhausted. Further, the memory transfers specified in the command contemplate both read and write and the latter may be of the same or different information.

DESCRIPTION OF THE DRAWINGS

FIG. 2 shows the code pattern employed during a word period to represent a command;

FIG. 3 shows the code pattern employed during a word period to represent data, including an example of a number;

FIG. 4 is a compilation of the components of FIG. 1 together with their usual content or function;

FIG. 5 is a table of the command instruction codes relevant to the invention;

FIG. 6 is a table of the indicators used to establish the end of the field for first access;

FIGS. 7 and 8 are tables of the offset and field length codes, respectively;

FIGS. 10*a* and 10*b* show the justification right in the data register of the number of FIG. 3 for the different offset codes of FIG. 9;

FIG. 11 is a table summarizing the operation of the justification and transfer logic of the invention; and FIGS. 12*a* – 12*h* form a flow diagram which may be incorporated into a computer system to provide the invention.

DESCRIPTION OF THE PREFERRED EMBODIMENT

A general purpose computer carries out a function by performing numerical mathematical operations according to a series of commands (the program) which, during their execution, the computer may modify either in a preset manner or according to the outcome of tests on intermediate results of computation. Its operations are consequently definable as arithmetic, input-output and sequencing and its equipment correspondingly comprises units which contribute logic, peripheral interface and control.

Figure 1:
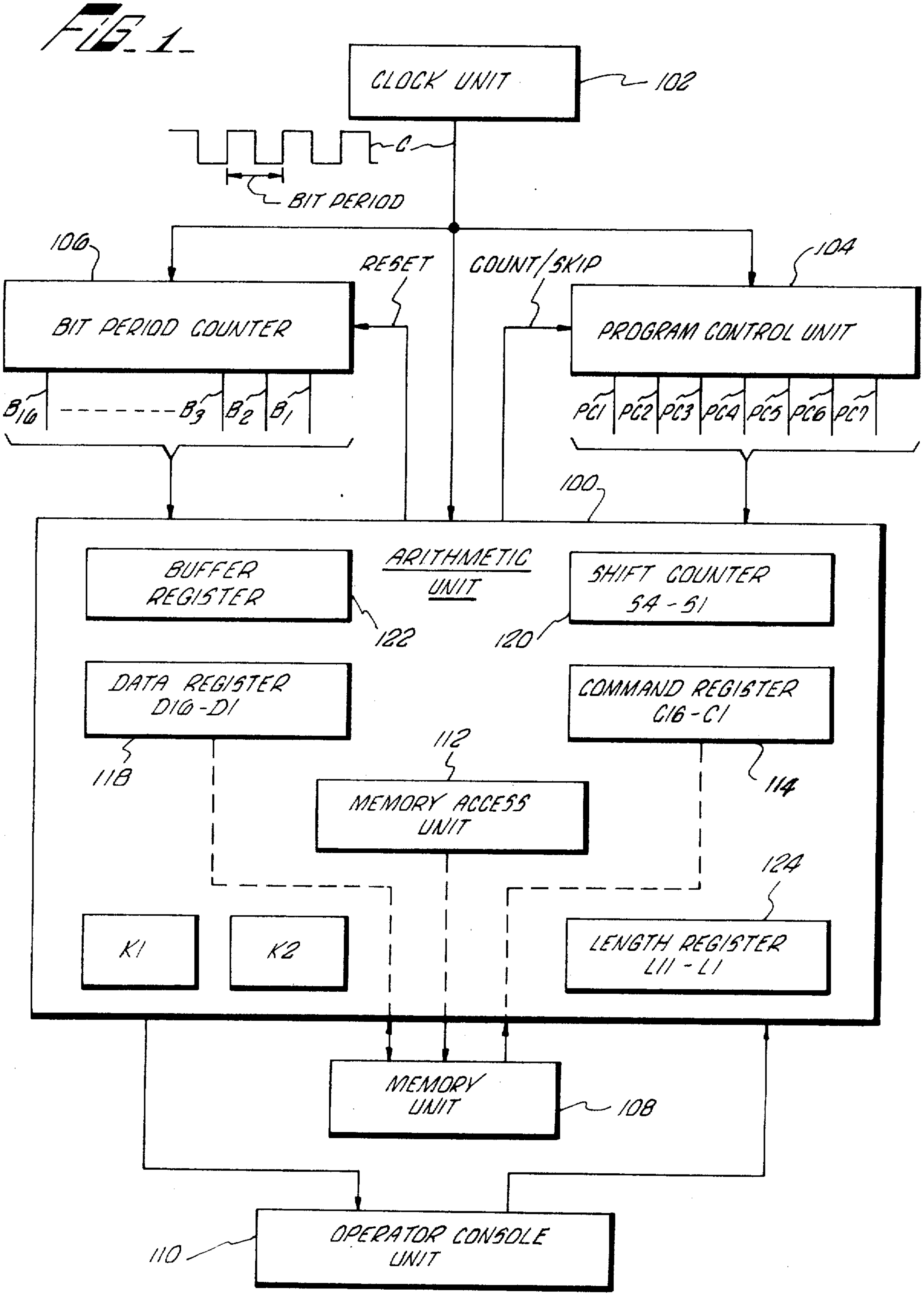
FIG. 1 is a block diagram of a portion of a computer system which may include the preferred embodiment of the invention.

Referring now to FIG. 1, here is shown a very generic block diagram of a preferred form of computer system for embodying the present invention. This system is of the general purpose type capable of storing numbers as combinations of bilevel states in sets of memory elements, and involves the sequential operation of circuits, including pulse sources, gates, etc. to trigger the memory elements in accordance with Boolean equations which represent the computer activity leading to the accomplishment of the desired objectives.

Arithmetic unit (AU) 100 is comprised mainly of networks which function to perform arithmetic and logic operations and to interconnect the registers, counters, input-output equipment, etc., of the system so as to route information in accordance with the commands selected by the program from the set which the computer is capable of executing. Accordingly, AU 100 is shown connected by lines to some units while embodying others, although it should be understood that a showing of connection or embodiment is a choice directed mainly toward teaching the invention and not actual structural configuration.

Although the inventive concept is quite applicable to other systems of representing information in a computer, it will be present herein with regard to a synchronized pulse system. By this is meant a system in which repetitive pulses, whether information-representing, or "clock" signals, or otherwise, are synchronized to occur at particular time intervals with reference to each other. In such a system, signals may be of square waveshape alternating between specific voltage levels, as, for instance, +10 volts and 0 volts (ground potential) present on a line; and it is most convenient to regard synchronization as being provided by clock signals of symmetrical square waveshape generated by a pulse generator, which may comprise a repetitive magnetic recording associated with a sensing electromagnetic transducer and pulse shaping circuitry, or a frequency-controlled square wave generator, or other appropriate means. Synchronization by such means implies that the potential of a line may change between the levels of +10 volts and 0 volts only at the time of the trailing edge of the clock signal pulse, the time between trailing edges being designated as a bit period.

Accordingly, the bit periods are established by clock unit (CU) 102 (FIG. 1) which emits symmetrical square wave signal C on lines to bit period counter (BPC) 106, program control unit (PCU) 104, AU 100 and, through the latter, to memory unit (MU) 108 and operator console unit (OCU) 110.

The computer processes are divided into sequential operations requiring equal periods of time ("word period") for execution. It is the function of BPC 106 to count clock signals C and to generate sequential and cyclical signals on output lines as required for the delineation of the word period. BPC 106 responds to 16 sequential clock signals C and then recycles; thus, by noting the output of BPC 106 (only one of its output lines may be at the high potential at a time), succeeding bit periods $B_1$ through $B_{16}$ may be identified. Such counters have been described in the literature and are well known to be capable of providing the basic timing sequence which controls the activation of appropriate computer portions, such as AU 100 in the present case. Accordingly, BPC 106 is shown in FIG. 1 as providing its outputs $B_1$ through $B_{16}$ to AU 100.

It is recognized, of course, that some computer organizations, with the intent to effectuate savings in throughput, are based on variable word periods; as this description proceeds, it will be apparent to those skilled in the art that such designs in no way preclude the incorporation of the invention, and it is for this purpose as well as for synchronization at initial start-up of the system that a reset line from AU 100 to BPC 106 is shown.

The organization of the computer corresponds to the programming technique which involves, in essence, the scheduling of the presentation of information to AU 100 on a time division basis. As mentioned, each step of the process represents a time interval (word period), equal to that for any other step and, in order that component interconnection and control and information routing proceed in an orderly fashion, is assigned a program count number (PC No.). Momentary reference to FIG. 12 will indicate that an operation is performed by executing the aforementioned steps in a predetermined sequence, said sequence including the repetition of steps or a subsequence of steps if required.

These PC Nos. are outputs of PCU 104, which may change its state in one of two ways as determined by the outcome of an operation: it may count progressively (as from PC1 to PC2 to PC3), or it may skip to a state outside its counting sequence (as from PC3 to PC6).

PCU 104 usually also takes the form of a counter the outputs of which are mutually exclusive and are accepted by AU 100 to render certain networks active during each word period so as to accommodate each of the operations. The content of PCu 104 is subject to being changed precisely at the end of each word period, as directed by the state of flip-flop K1 of AU 100 during the last bit period ($B_{16}$) of each word period and manifested on the count/skip line from AU 100 to PCU 104. Further, since flip-flop K1 is connected to be triggered in accordance with the manipulation in progress during the word period (i.e., flip-flop K1 "follows" the operation), it is apparent that the results of the operation underway provide the foundation for operations to be undertaken. Thus, the computer sequences in orderly fashion to accomplish its program.

Components chosen to exemplify the inventive system are arranged to handle information in 16-bit words of two types, a command and a data word.

FIG. 2 is a diagram showing the arrangement in a word of information representing a command, used by the operator to effectuate sequencing of the computer with a view to achieving the desired result. The word, as stored in command register (CR) 114, is divided into 16 bits each in a separate stage C16-C1, and these are grouped according to the information stored: stages C16-C15 for the instruction code (FIG. 5), stages C14-C6 for the address of a data word (FIG. 3) to be accessed, stage C5 for an indicator of the field end selected for first access (FIGS. 6 and 11), and stages C4-C1 for the offset code (FIG. 7). From these figures, it is apparent that the embodiment selected for exemplifying the invention deals with four instruction codes (for memory access), up to a 16-bit offset (an entire word) and a 612 data word storage.

FIG. 3 shows the arrangement in a word of information representing data as stored in data register (DR) 118; it can be seen from the example shown in the figure that the computer provides for operating on binary numbers comprising 16 bits. (It is recognized that data bits are usually accompanied by sign and/or overflow indicator bits, but for purposes of teaching this invention, such indicators have been omitted.)

It is noted that the arrangements of both FIGS. 2 and 3 contemplate increasing bit significance from right to left, i.e., the least significant bit (LSB) of a combination is in its rightmost bit position while its most significant bit (MSB) occupies its leftmost bit position.

Before going into a description of the details of the circuitry of the invention, the convention employed herein for nomenclature will be explained.

The circuits of the invention are used to perform logical operations ("and," "or," etc.) and are represented in the form of equations shown in Boolean notation.

The terms of the equations will be mechanized in the circuits by output signals from memory elements (flip-flops), which are electronic devices having two possible steady state conditions. One of these conditions is referred to as "set" and the other condition is referred to as "reset"; when a flip-flop is described as being set, it will be understood to be storing a bit 1, and when it is described as reset, it will be understood to be storing a bit 0.

The flip-flops are characterized by two inputs, only one of which may have an actuating signal at a time, and two outputs having complementary voltages. Input signals to the flip-flop are supplied by gating networks and output signals from the flip-flop are supplied to gating networks. It is the operation of these networks which will be described by means of the Boolean equations, each of which thus defines the triggering of a flip-flop. The terms of the equation correspond to flip-flop output signals and the equation represents the generation of a flip-flop input signal during a bit period, the flip-flop triggering actually occurring at the end of the period, (i.e., at the fall of signal C) so that the flip-flop is in the desired state during the succeeding period.

The nomenclature selected employs combinations of letters and numbers for designating the terms of the equations. The flip-flops themselves are designated by combinations of upper case letters and numbers; thus, flip-flops B1, K2, etc. One output signal of the flip-flop is characterized by the corresponding upper case letters with the associated number shown as a subscript; thus, signals $B_1$, $K_2$, etc. In order to distinguish the complementary output of the flip-flop, it is accompanied by an affixed prime; thus, signals $B_1'$, $K_2'$, etc. It will be understood that the output signals partake of a pair of voltage levels, such as +10 volts and 0 volts, on a line, and, when the unprimed signal output of a flip-flop is high in voltage and the primed signal output is low in voltage, the flip-flop is set, while, for the reverse condition, the flip-flop is reset; thus, flip-flop B1 is set when signal $B_1$ is at +10 volts and signal $B_1'$ is at 0 volts.

On the other hand, the signals to the flip-flops are designated by corresponding lower case letters with the associated number shown as a subscript. The input signal for rendering the flip-flop set is designated by a subscript 1 prefixing the lower case letter; thus, signals ${}_1b_1$, ${}_1k_2$, etc. The input signal for rendering the flip-flop reset is designated by a subscript 0 prefixing the lower case letter; thus, signals ${}_0b_1$, ${}_0k_2$, etc.

From the above, it is apparent that the embodiment chosen to teach the present invention will make use of the R-S flip-flop and also chosen are the logical connectives AND and (inclusive) OR (the connectives are usually mechanized in circuitry in the form of gates and mixers, respectively). However, it should be clearly understood that any of the memory elements and connectives known to logic designers, such as described in the book, "Logical Design of Digital Computers" by M. Phister Jr, Wiley and Sons, Inc., N.Y., 1958, pages 53 through 56 and 121 through 132, may also comprise suitable choices.

It may now be appropriate to discuss briefly the functions of some of the other components of FIG. 1 with regard to system operation under the invention.

Memory unit (MU) 108 is best contemplated as a random access word store such as mechanized in the form of magnetic core memory element arrays. It is accessed through control by AU 100 of Memory access unit (MAU) 112, in which sequential word addresses are set up corresponding to the word positions assigned to store the field, and, since such units are well known, further discussion will not be presented here. The word addresses are contained in the command word previously transferred from MU 108 to command register (CR) 114, comprising 16 stages C16-C1 (cf. FIG. 2), structured as previously outlined.

Data register (DR) 118, comprising 16 stages D16-D1 (cf. FIG. 3), is used for storing the data word.

Shift counter (SC) 120, comprising four stages S4-S1, is used to keep track of the shifts made in DR 118 during the justification of its content. Four stages in SC 120 are required despite the fact that, as will be shown, this system contemplates justification left or right according to the lesser distance on comparison of the beginning or end of the field from the beginning or end of the word (i.e., according to the magnitudes of the offsets) and this magnitude cannot exceed 7 (i.e., one-half word length), because SC 120 is also used as a control for restoring the pre-justification alignment of DR 118.

Flip-flop K2 is used as a justification direction indicator (cf., FIG. 11); justification left when set (K2=1) and justification right when reset (K2=0).

Flip-flop K1 is used to control PCU 104; skip when set (K1=1) and count when reset (K1=0).

Buffer register (BR) 122 is used as intermediary storage between DR 118 and other computer equipment, such as input-output (I/O) units; since it is generally not directly involved with the system of the invention, this register will not be detailed.

Length register (LR) 124, comprising 11 stages L11-L1, is set up with the field length in bits (cf., FIG. 8), which may be a content up to the storage capacity of MU 108.

For quick reference during the ensuing discussion the above units are tabulated in FIG. 4.

It is now appropriate to detail the invention; for this purpose, reference is made to the flow diagram shown in FIGS. 12*a*–12*h*, of which an overview (FIG. 12*a*) will first be presented.

It is seen that a general path for computer sequencing during the memory access of this invention is provided in orderly counting fashion from PC1 to PC7 and back to PC1; however, one deviation may take the computer directly from PC3 to PC6, thereby skipping PC4 and PC5, and another deviation may bypass PC1 by taking the computer from PC7 to PC2.

It should be udnerstood that these paths are selected through prior handling of the command by the computer system and operator input through OCU 110, but for purposes of simplicity of presentation, it is expedient to assume that the operator, by tapping appropriate keys on OCu 110, has already effectuated sequencing from an idle condition through a command identification routine and to PC1. In PC1, there is accomplished access of the command (through input of a control number, for example) to CR 114 (FIG. 2), insertion of the field length code (FIG. 7) into LR 124 and reset of all flip-flops involved in the memory access except those of CR 114 and LR 124.

The main path provides for all contingencies within the scope of the invention, as follows.

In PC2, the data word address specified in CR 114 is utilized by MAU 112 and AU 100 to cause the data word to be transferred to DR 118, and a unit change is made to the address so that the next data word (containing the adjacent portion of the field) will become available on the next cycle through the path. In PC3, a test is made for the existence of an offset code and, if one is found, i.e., the beginnings or ends of the field and the data word are not aligned, a test of the offset code magnitude is made in PC4 to determine whether it is equal to or less than half the distance (in bits) through a data word (i.e., here, 1 to 7 bits) or greater than this distance (i.e., 8 to 15 bits). PC5 then justifies left or right, respectively, and keeps track via SC 120, which counts each bit period of shift of DR 118, and via stages C4-C1 (the offset code) in which the content decrements or increments, respectively, until reset. PC6 then effectuates transfer from DR 118 to BR 122 of the portion of the data word containing the portion of the field only as DR 118 is shifted, logs the number of field bits transferred by decrementing LR 124 and performs a test of the instruction code in CR 114 to provide appropriate information in DR 118 for subsequent (PC7) transfer to MU 108; zeros if the data word is no longer needed (DR 118 is reset), the same information it previously had (DR 118 is recirculated), new information directly from an outside source such as I/O equipment (DR 118 is connected to the I/O device), or new information indirectly from an outside source via BR 112 (DR 118 is connected to BR 122). In PC7, utilizing MAU 112 again, the transfer from DR 118 to MU 108 is made into the same word position of the latter and a test is made to determine whether or not the data word presently in DR 118 is the last to be handled, i.e., contains the MSB or LSB of the field not already transferred. If the word is not, the computer sequences to PC2 to access and operate on the next word, but, if it is, the computer sequences to PC1 to access the next command in the program, since the entire field has been operated upon.

Subsequence paths in the flow provide for special omissions as determined by tests previously made. Thus, if during PC3, the offset test indicates that alignment already exists, e.g., the field MSB happens to be the first data word bit or its LSB happens to be the last data word bit, then the offset magnitude test of PC4 and the justification step of PC5 are not needed and, accordingly, the computer skips from PC3 directly to PC6. Further, it should be apparent from the above that the paths PC3 to PC4 or PC3 to PC6 are mutually exclusive, whereas the path from PC7 to PC2 will be followed once for each data word encompassed by the field, and that the path PC7 to PC1 will be followed just once (at the end of handling the last data word containing the field or part thereof).

In the detailed flow diagram of FIGS. 12*b*–12*h*, each rectangle represents a word-time block (word period) of computer operation, and within each rectangle, there appear concise statements indicating the aforementioned activities during the word period. Below each rectangle, equations are written which define how each statement made therein is reduced to practice in the computer. These equations will now be explained.

Referring to PC1, the first two statements made call for entering the command and field length into CR 114 and LR 124, respectively; the logic for filling CR 114 and LR 124 is not given here in order to avoid encumbering this specification with detail not directly related to the system of the invention and which detail may be found in the literature. However, where it is considered helpful to indicate the activity, it will be entered parenthetically in the word-time block.

The next statement specifies reset of all flip-flops of AU 100 except those of CR 114 and LR 124 and, for convenience, an exception to the previously described notation is used to summarize identical activity of all of the flip-flops of a many staged register: the brackets around a register designation indicate that its content is switched to the state shown. Thus, the notation [DR]=0 signifies that, during the word period, stages D16-D1 are all reset. The non-specification of a bit period for this activity means that it will occur at the first bit period in a PC No., period $B_1$, which has also been selected for reset of flip-flops K1 and K2, as the respective equations indicate.

Since, as has been pointed out, it is the state of flip-flop K1 at period $B_{16}$ of a word period that determines which of the two directions PCU 104 will follow when signal C falls at the end of period $B_{16}$, i.e., if K1 is reset at period $B_{16}$, PC 104 will cause horizontal sequencing (count) but, if K1 is set at period $B_{16}$, PC 104 will cause vertical sequencing (skip), and since flip-flop K1 is reset during PC1, sequencing through the flow diagram will be horizontal and the next word period will be characterized by the activity of PC2.

Inasmuch as the computer may enter PC2 from either PC1 or PC7 and for the latter case, a prior sequence may have left a content in SC 120, such content is cleared by a reset:

[SC]=0.

Here also, MU 108 is accessed by MAU 112 according to the address in stages C14-C6 of CR 114 and the word is transferred to DR 118:

[DR]=[MU].

Since, as has been noted, this system provides for handling a field from either of its ends (MSB or LSB) to the other, the word read out presents several possibilities: it may contain both the MSB and LSB ends (the field is contained within this word) or either end only. In the first case, the present word will be the only one accessed for this field. In the second case, this word will be the first accessed for this field and, if it contains the MSB, the next segment of the field is in a memory word with an address one unit more than the present word but, if it contains the LSB, the next field segment is in a memory word with an address one unit less than the present word. The case that prevails is identified by the operator and manifest by the state of stage C5 or CR 114: MSB, C5=1; LSB, C5=0 (see discussion of FIGS. 2 and 6 above). It follows that the outputs of stage C5 must contribute input to the gates which mechanize the increment-decrement logic, which, of course, will be recognized by those skilled in the art, as follows: in the case of stage C6, the set and reset equations serve for both increment and decrement but for the other stages C14-C7, the left terms of the equations serve for increment and the right terms serve for decrement. The gates which these equations represent, in brief, operate, for any number stored in stages C14-C7 with its MSB in stage C14 and its LSB in stage C7, to increment by complementing the stage until after the first bit 0 occurs, and subsequently not complementing, and to decrement by complementing the stage until after the first bit 1 occurs and subsequently not complementing.

Lastly in PC2, to assure sequencing to PC3, flip-flop K1 is reset since it may have been set during the preceding word period if the computer had been in PC7.

The sole function served by PC3 is a determination of the need for justification of the word in DR 118 by observing whether or not any of the stages C4-C1 is set. If none is set during, for instance, period $B_1$, justification is not required (FIG. 7) and PC4 and PC5 may be skipped by setting flip-flop K1:

$$_1k_1=(C_4'C_3'C_2'C_1')B_1.$$

Otherwise, justification is required, flip-flop K1, which entered PC3 reset, remains so and a count is made to PC4.

On leaving PC3, then, the computer may take either of the two routes shown in the flow diagram. At present, it will be presumed that an offset exists; accordingly, the computer enters PC4.

Here, the offset magnitude is determined by observing stage C4 during period $B_1$ and the test result is set up in flip-flop K2. As can be seen from the offset code table of FIG. 7, the reset condition of stage C4 uniquely defines offset codes not exceeding 7 and so flip-flop K2 may be set accordingly:

$$_1k_2=C_4'B_1.$$

Thus, flip-flop K2 indicates which direction of shift in DR 118 is the shortest for alignment of its content.

Also in PC4, since flip-flop K1 has entered set and a count to PC5 is desired, this flip-flop is reset:

$$_0k_1=B_1.$$

Figure 9A:
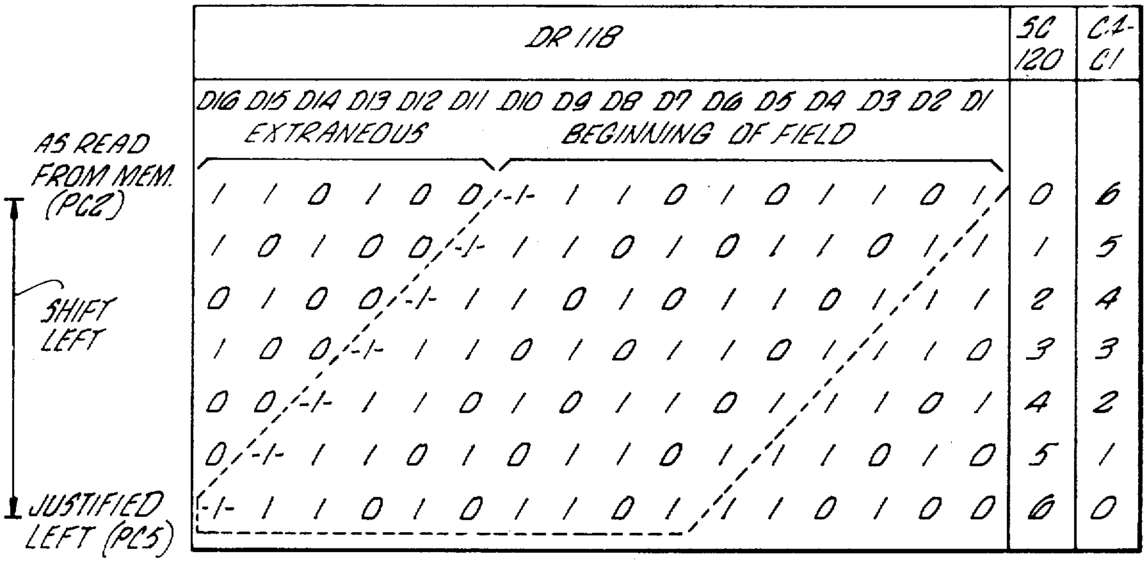
FIGS. 9*a* and 9*b* show the justification left in the data register of the number of FIG. 3 for two different offset codes.
Figure 9B:
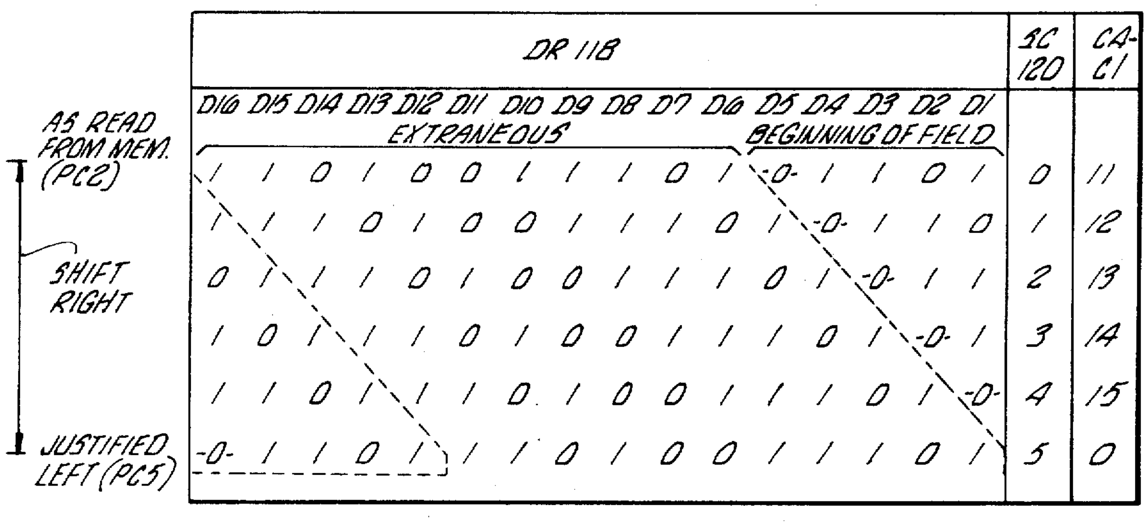
Figure 12A:
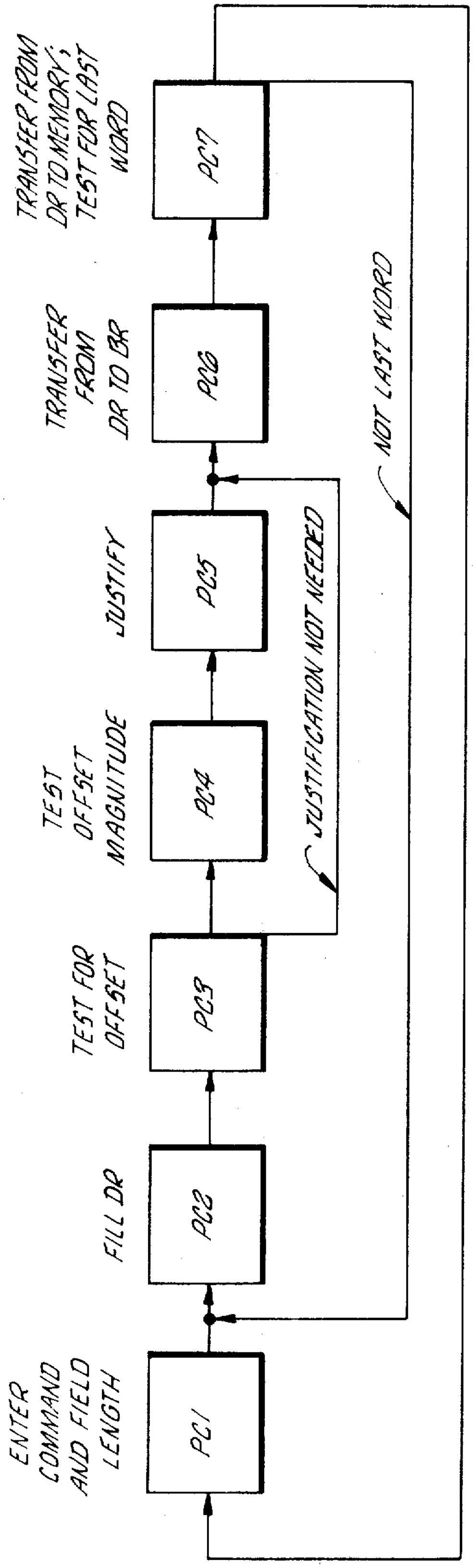
Figure 12B:
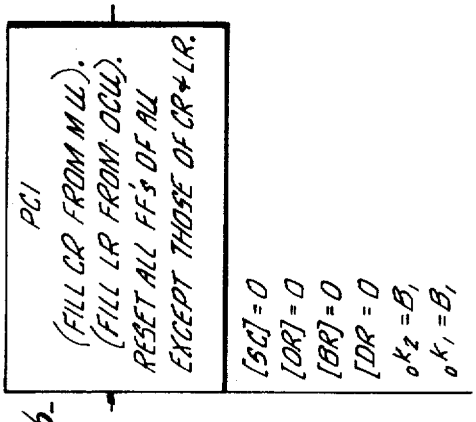
Figure 12C:
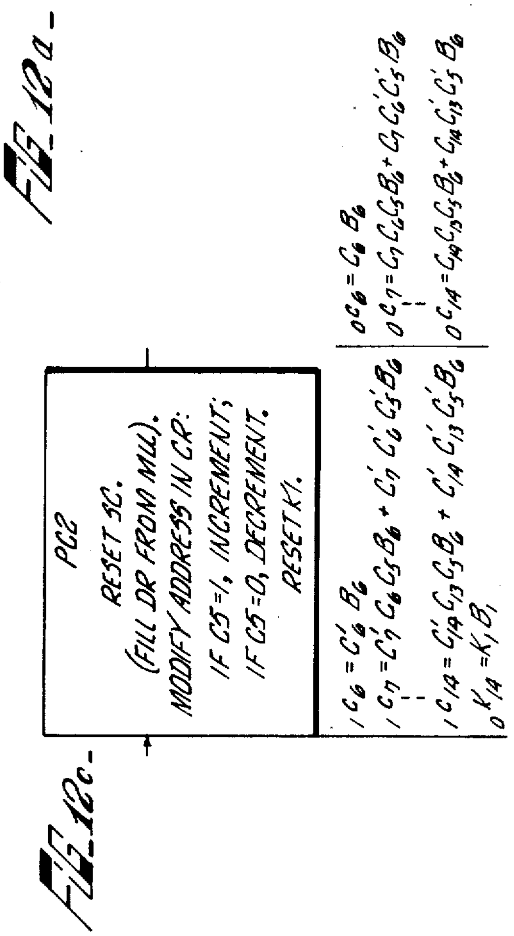
Figure 12D:
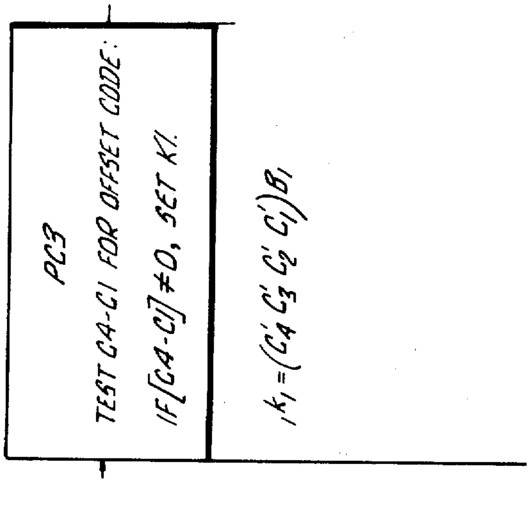
Figure 12E:
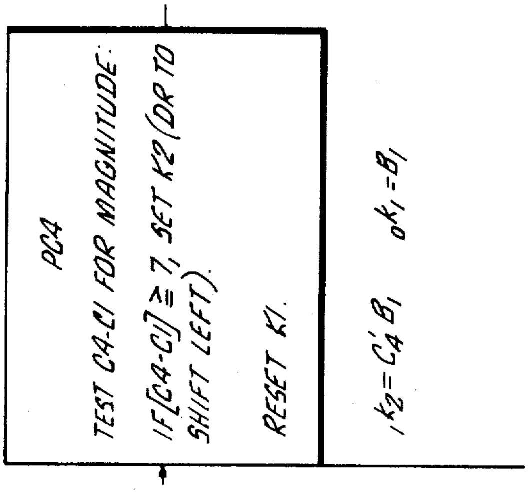
Figure 12F:
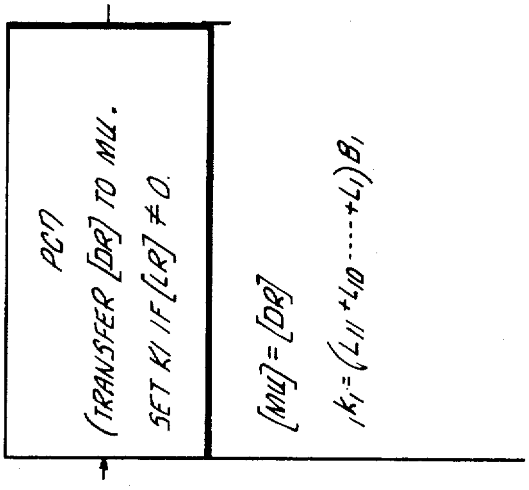

In PC5, the content of DR 118 is shifted left (K2=1) or right (K2=0) to justify left if the field is to be handled MSB end first (C5=1) or similarly shifted to justify right if the field is to be handled LSB end first (C5=0). As can be seen from the equations, DR 118 is arranged for recirculation, that is, a stage "follows" a prior stage in the chain, with, of course, appropriate regard for the direction of shift. For example, the state of stage D1 during a bit period is the same as that of stage D16 (for left shift) or stage D2 (for right shift) the preceding bit period. During this activity, stages C4-C1 are used as a counter which decrements or increments to zero, and when zero is reached (C4=C3=C2=C1=0) the recirculation and decrement/increment ceases. Simultaneously, SC 120, which was reset in PC2, increments for each shift of DR 118, also stopping when the count in stages C4-C1 reaches zero. Those skilled in the art of computer design will be familiar with counter and recirculation logic and recognize that given here as derivable from corresponding truth tables; accordingly, no further description of the derivation is considered necessary. However, FIGS. 9 and 10 may be referred to for examples, the former showing left justification for the beginning of a field (dashes emphasize the MSB) and the latter showing right justification for the end of a field (dashes emphasize the LSB), together with the resultant stages of SC 120 and stages C4-C1 when the justification is completed.

Since flip-flop K1 remains reset in PC5, the computer next enters PC6.

PC6, then, regardless of whether entered via PC3 or PC5, finds the word in DR 118 justified, stages C4-C1 reset and a count in SC 120 representing the bit shift undergone by DR 118, i.e., how far its content has been moved compared to the original configuration in the register.

Transfer is now made between DR 118 and BR 122, serially by bit, from the most significant stage D16 of DR 118, if read out is from MSB to LSB (C5=1) or from its least significant stage, D1, if read out is from LSB to MSB (C5=0):

$$[BR]=[D16]C_5+[D1]C_5'.$$

However, in order not to transfer extraneous data (cf., FIGS. 9 and 10), the logic provides for stopping the transfer when the end of the field is reached. For cases where alignment involved end-around recirculation in DR 118, which FIGS. 9*b* and 10*a* exemplify, decrement of SC 120 to reset will serve this purpose, and, for cases where alignment did not involve end-around recirculation in DR 118, which FIGS. 9*a* and 10*b* exemplify, increment of SC 120 to reset will serve; accordingly, the term $(S_4+S_3+S_2+S_1)$, which identifies all counts of SC 120 other than zero, appears in the [BR]equation. Since, from FIG. 11, it is seen that the former cases are identified by different states of flip-flops C5 and K2, i.e., the term $C_5K_2'+C_5'K_2$, whereas the latter cases are identified by identical states of these flip-flops, i.e., the term $C_5K_2+C_5'K_2'$, these terms appear in the SC 120 decrement/increment equations, respectively.

Simultaneously with the above activity, information is reentered into DR 118, with a choice of four different sources according to the instruction code in stages C16 and C15 or CR 114 as shown in the table of FIG. 5.

The read code $C_{16}'C_{15}'$ resets the register by triggering the reset inputs of its stages at sequential bit periods:

$$O''1=C_{16}'C_{15}'B_1$$
$$O''2=C_{16}'C_{15}'B_2$$
$$\vdots$$
$$O''16=C_{16}'C_{15}'B_{16}.$$

The read-restore code $C_{16}'C_{15}$ recirculates the register left for MSB-first read-out (C5=1):

$$[D1]=C_{16}'C_{15}[D16]C_5$$
$$[D2]=C_{16}'C_{15}[D1]C_5$$
$$\vdots$$
$$[D16]=C_{16}'C_{15}[D15]C_5;\text{ and}$$

right for LSB-first read-out (C5=0):

$$[D1]=C_{16}'C_{15}[D2]C_5'$$
$$[D2]=C_{16}'C_{15}[D3]C_5'$$
$$\vdots$$
$$[D16]=C_{16}'C_{15}[D1]C_5'.$$

The write code $C_{16}C_{15}'$ provides for input from peripheral I/O equipment serially by bit as DR 118 shifts:

$$[D1]=C_{16}C_{15}'[I/O]$$
$$[D2]=C_{16}C_{15}'[I/O]$$
$$\vdots$$
$$[D16]=C_{16}C_{15}'[I/O].$$

Lastly, the write code $C_{16}C_{15}$ provides for input from BR 122 serially by bit as DR 118 shifts:

$$[D1]=C_{16}C_{15}[BR]$$
$$[D2]=C_{16}C_{15}[BR]$$
$$\vdots$$
$$[D16]=C_{16}C_{15}[BR].$$

Further in PC6, LR 124 is decremented for each bit transferred, the decrement logic being cut off when it is reset, the reset condition indicating that the field end has been reached during the word presently being manipulated.

In all of the above cases, of course, in order not to disturb any part of the word not also a part of the field, as before, the shift and transfer is controlled to occur only when SC 120 is not reset.

As a consequence, it is apparent that, after transfer, the prealignment configuration (as of PC3) in DR 118 has been restored.

Since flip-flop K1 remains reset, the computer enters PC7 where DR 118 is returned to MU 108 parallel by bit under access by MAU 112.

Finally, flip-flop K1, which has entered PC7 reset, is set if LR 124 does not reach zero so that a skip will be made to PC2 to pick up and handle the next word containing part of the field.

It is again remarked that the invention has been described with regard to a computer system which, although well known, nevertheless is of specific configuration. Since the invention may quite easily be adapted to other configurations without a substantial change in essence, it follows that such adaptations are contemplated as within its scope. Further, simplifications of the Boolean equations representing the system's operation to remove redundancies, economize on gating elements, etc., have been relegated to those skilled in the art since, to a great extent, these are determined by the preferred approach to computer design. In brief, the present description should be considered exemplary for teaching those skilled in the computer arts and not constrained to the showings herein or in the reference.

What is claimed is:

1. In a word organized computer, a memory accessing system capable of accessing a bit field, comprising:

an addressor for the word which contains an end bit of the field;

an identifier of the field length;

a register;

means responsive to said addressor to fill said register with the addressed word;

an indicator of whether or not the end bit is aligned in the first or last bit position of said register;

a justifier responsive to said addressor and an indication of non-alignment from said alignment indicator to shift the word in said register toward the end of said register to which the end bit is closest until said alignment indicator indicates alignment;

a buffer;

an identifier of the bit positions of said register containing bits of the field; and means responsive to said field-length and field-bit-position identifiers to transfer serially by bit from said register to said buffer only field bits.

2. The system of claim 1; and means to return the word in said register to the memory.

3. The system of claim 1 wherein the field may consist of any number of bits up to the storage capacity of the memory;

an indicator of end bit significance; and means responsive to said end-bit-significance indicator to modify said addressor to cause said fill means to fill said register sequentially with memory words containing next portions of the field.

4. The system of claim 1; and means operative simultaneously with said transfer means to restore the field bits in said register.

5. The system of claim 1; and means operative simultaneously with said transfer means to substitute zeros for the field bits in said register.

6. The system of claim 1; and means operative simultaneously with said transfer means to substitute information from said buffer for the field bits in said register.

7. The system of claim 1; and means operative simultaneously with said transfer means to substitute information from an outside source for the field bits in said register.

8. The system of claim 3 wherein said addressor comprises a register having stages for storing a word address and stages for storing a number indicating the offset of the end bit from an end of the memory word.

9. The system of claim 8 wherein said addressor modifier comprises a network for incrementing and decrementing the address stored in said addressor.

10. The system of claim 8 wherein said alignment indicator comprises the offset number stored in said addressor.

11. The system of claim 9; and means to decrement said field-length identifier one unit for each bit transferred by said transfer means.

12. The system of claim 11 wherein said network is responsive to only non-zero content in said field-length identifier.

13. The system of claim 10; and a network for incrementing and decrementing said alignment indicator one unit for each bit shift of the word in said register provided by said justifier and operative to recycle the counting sequence of said alignment indicator.

14. The system of claim 13 wherein said justifier is responsive to only non-zero content in said alignment indicator.

* * * * *